United States Patent [19]
Bauer et al.

[11] Patent Number: 5,611,747
[45] Date of Patent: Mar. 18, 1997

[54] WOBBLE-HINGED METAL FITTING FOR AN ADJUSTABLE MOTOR VEHICLE SEAT

[75] Inventors: Heinz Bauer; Burckhard Becker; Ernst-Reiner Frohnhaus, all of D-Solingen, Germany

[73] Assignee: C. Rob. Hammerstein GmbH & Co. KG, Solingen, Germany

[21] Appl. No.: 586,213

[22] Filed: Jan. 16, 1996

[30] Foreign Application Priority Data

Jan. 13, 1995 [DE] Germany .................. 195 00 914.2

[51] Int. Cl.⁶ .................................................. F16H 1/32
[52] U.S. Cl. ........................ 475/162; 475/341; 297/362
[58] Field of Search .................................. 475/162, 174, 475/176, 341, 342, 347; 74/390; 297/362

[56] References Cited

U.S. PATENT DOCUMENTS

| | | | |
|---|---|---|---|
| 4,016,780 | 4/1977 | Baranyi | 475/176 |
| 4,371,207 | 2/1983 | Wilking et al. | 475/162 X |
| 4,457,556 | 7/1984 | Klingelhofer | 475/176 X |
| 4,538,855 | 9/1985 | Peetz et al. | 475/174 X |
| 4,582,360 | 4/1986 | Becker | 297/362 |
| 4,732,425 | 3/1988 | Terada et al. | 297/362 |
| 4,736,986 | 4/1988 | Kato et al. | 297/362 X |
| 4,786,110 | 11/1988 | Mahling et al. | 297/362 |
| 5,005,906 | 4/1991 | Suzuki et al. | 475/162 X |
| 5,542,772 | 8/1996 | Reuber et al. | 297/362 X |

*Primary Examiner*—Charles A. Marmor
*Assistant Examiner*—Peter T. Kwon
*Attorney, Agent, or Firm*—John Lezdey & Associates

[57] ABSTRACT

The present invention teaches a wobble-hinged metal fitting suitable for adjustable motor vehicle seats, and more particularly, for back seat gears. The fitting includes two hinged brackets connected together by an eccentric, a carrier and shaft running therethrough. Each bracket contains an internal gear and an external gear associated with the internal gear. The eccentric is positioned next to one of the gears and is turnably connected to the shaft. The eccentric includes means for compensating play in the seat which consist of an eccentric part having a receiving inlet, at least one rolling body, at least two jamming planes and at least one spring. The spring is positioned such that it pressures the rolling body to come in contact with the jamming plane on one side and the gear on the other side. The carrier is positioned such that when the rolling body is in a locked position, an initial turning movement of the shaft results in the release of the locked rolling body before the eccentric starts to move.

16 Claims, 1 Drawing Sheet

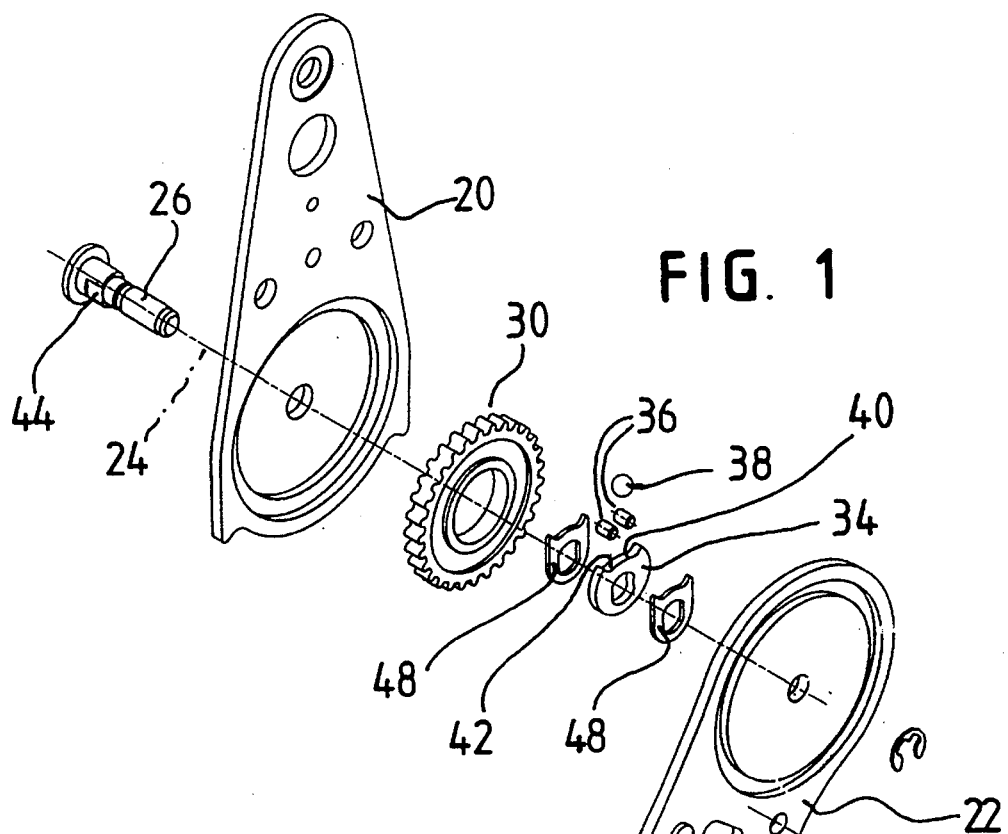
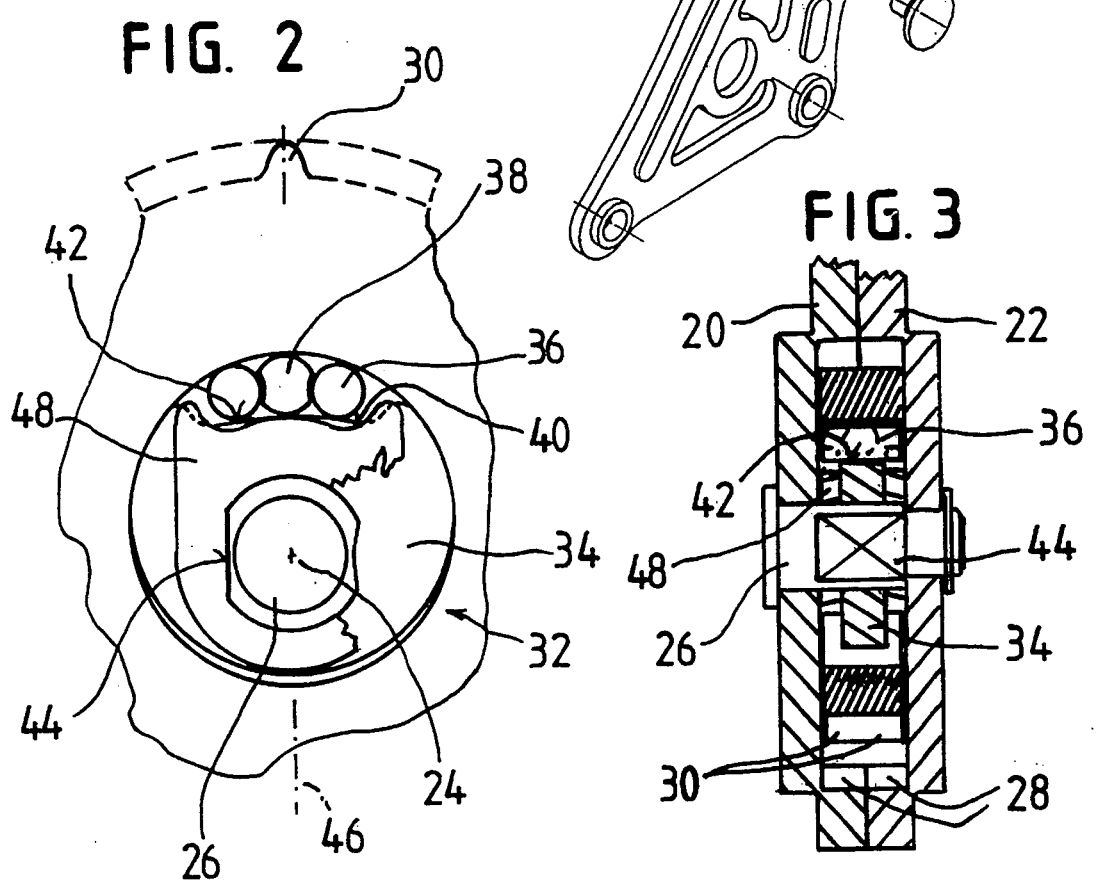

WOBBLE-HINGED METAL FITTING FOR AN ADJUSTABLE MOTOR VEHICLE SEAT

BACKGROUND OF THE INVENTION

1. Field of the Invention

Wobble-hinged metal fittings have been proven for adjusting devices of motor vehicle seats, for manual as well as motoric drive. They offer a high gear reduction and can be projected in a self jamming-way, meaning in the back flux way.

2. Description of the Prior Art

Via the eccentric the two gear rims, meaning the internal gear and the external gear, remain in gear. The eccentric can be in the inside of the external gear or be engaged around the external gear.

With the wobble-hinged metal fitting of the above mentioned kind known from DE 94 05 443 U1, as a compensation for the mechanical play the eccentric is provided with two essentially identically shaped eccentric segments, which can be pushed away from each other via a spring, so that the play between eccentric and the inside of the external gear can be abolished. Here, however, rubbing planes are projected, which transform a major part of the driving force into heat. This is disadvantageous.

SUMMARY OF THE INVENTION

Departing from that it is the task of the invention by keeping the compensation of a play between the eccentric and the matching gear rim to develop the wobble-hinged metal fitting of the above mentioned kind in such a way that the device for compensation of the play in the case of the drive practically does not swallow-up drive energy, but in the resting position, however, further automatically effects compensation of the mechanical play and furthermore effects a jamming between eccentric and matching gear rim.

Departing from the wobble-hinged metal fitting of the above mentioned kind this task is solved by the eccentric forming a receiving-inlet in the range of its maximum, which shows jamming or inclined planes running in the opposite direction towards each other, that rolling bodies are planned, which are adjusted to these jamming planes, that at least one spring elastically pressures the rolling bodies in such a way that they are adjusted to the jamming planes as well as to the neighbouring gear rim, and that a carrier is planned which initially unlocks the at least one rolling body, jamming in the turning direction, from its locked position when there is a turning motion of the shaft, before the eccentric is turned.

With this wobble-hinged metal fitting the maximum of the eccentric, meaning its maximum range, is not adjusted directly to the matching gear rim, but above the rolling body. The rolling bodies are flexibly arranged in the receiving-inlet. This inlet is forming jamming planes running diagonally, which are bent towards each other in the opposite direction, whereby they are bent in an obtrous angle V-shaped or running towards each other in direction of a V upside down. By at least one spring the rolling bodies are prepressured in such a way that they take a jamming position in the resting position of the wobble-hinged metal fitting, meaning that they are adjusted in a locked way at the neighbouring gear rim device as well as to the receiving-inlet. In such a way the wobble-hinged metal fitting is free of play in the resting position on one hand. On the other hand the eccentric is adjusted to the matching gear rim device and is connected with it in a locked way, that a relative movement between these two cannot occur.

To get out of the resting position into the drive position the rolling bodies are moved out of their locked position according to the invention, before a turning of the eccentric against the matching gear rim device can occur. For this at least one carrier is planned. It is turnably connected with the shaft. The eccentric part, however is not directly turnably connected with the shaft, but is only taken by the shaft after the turning of a few degrees, independent from the turning direction. Expressed in other words there is a slip between shaft and eccentric part. Due to that the adjustment of the two gear rim devices effected by the eccentric against each other does only occur, if the carrier has already unlocked the rolling body jamming in the turning direction, from its locked position.

Preferably two rolling bodies are planned, they are preferably projected as a cylinder in drum or diabolo shape. The carrier is preferably symmetrically slipable also the eccentric part, preferably also the arrangement of the rolling bodies and their spring. Preferably only one spring is planned which is arranged between the two rolling bodies and which pushes them apart.

Further advantages and characteristics as prior to the claims and the following description of an embodiment of the invention not restricted to the invention, which is explained further with regard to the drawing: In this drawing shows:

BRIEF DESCRIPTION OF THE DRAWINGS

FIG. 1 a perspective explosion illustration of the wobble-hinged metal fitting according to the invention, FIG. 2 a sectional view diagonal to the shaft through the assembled wobble-hinged metal fitting and FIG. 3 a top view on the central area of the metal-fitting according to the invention, seen from the axial direction, illustrated are the shaft, the eccentric and the matching gear rim device.

DESCRIPTION OF THE PREFERRED EMBODIMENTS

As can be seen from the figures, the wobble-hinged metal fitting has a first hinged bracket 20, and a second hinged bracket 20, both can be turned and locked against each other along an axis. This axis 24 joins together with a center axis of a shaft 26.

In both hinged brackets 20, 22 each, an internal gear 28 is projected. In FIG. 1 it is not illustrated explicitly, but it can be seen from FIG. 2. The two internal gears 28 of both hinged brackets 20, 22 have a different number of teeth, for example the difference of the number of teeth may be one.

An external gear 30 is hinged with each internal gear 28. In the embodiment shown, the two external gears 30 are formed by a one-pieced gear rim, which engages into the one internal gear 28 with one of its partial areas and with its other axial partial area reaches into the other internal gear 28.

Different embodiments are also possible. The two internal gears 28 may show the same number of teeth, in that case the two external gears 30 must have a different number of teeth. The two internal gears 28 may also have an un-even number of teeth and the two external gears 30 different number of teeth.

The external gears 30 are arranged within the internal gears 28. They have a diameter of the crown circle, which is at least one depth of a tooth smaller than the diameeter of the root circle of the matching internal gear 28.

In the embodiment shown the external gears 30 are projected as rings, they have a common eccentric bore. In this an eccentric is arranged in such a way that it can be turned, and also connected with the shaft 26 so it can be turned. The eccentric consists of an eccentric part 34, two cylinder-shaped rolling bodies 36 and a pressure spring in the shape of a rubber ball which is arranged between these rolling bodies.

The eccentric part 34 has a receiving inlet 40 for the rolling bodies 36 in the area of the maximum eccentricity. It shows two jamming planes 42 which are arranged in such a way that the two rolling bodies 36 pressed apart from each other by the pressure spring 38 are pressed into the slot which gets conic in the direction of the pressure. This slot is formed by a jamming plane 32 on one hand and the interior wall of a bore of the external gear 30.

The receiving inlet 40 projects each time a stop shoulder for the rolling bodies 36, it is a limitation for the maximum jamming way of the rolling bodies 36. Finally it projects a center inlet for the spring 38 projected as a ball.

The eccentric part 34 can be sliped symmetrically. It has a hole for the shaft. It is not exactly round, but stop faces jump forward from an imagined circular line. On each side two stop faces each are planned, they each stand in an obtrous angle of nearly but smaller than 180° towards each other. Expressed differently, points of an obtrous angle protrude into the actual circular area. If one connects the point of an obtrous angle, meaning the intersection of the stop faces on the one hand with the point, meaning the intersection of the other side, then the connecting line runs through the axis 24 of the shaft 26.

On the shaft two reductions 44 are projected running parallel towards each other, together they form a two-edge. In the resting position of the wobble-hinged metal fitting these two reductions 44 are positioned in a level, which is parallel to the level of symmetry of the eccentric 32 and also of the eccentric part 34. In FIG. 3 the last level, which runs in a right angle to the drawing level, is illustrated by the line 46.

Two carriers 48 are arranged to the eccentric 32, both are arranged on both sides of the eccentric part 32 and in the constructed state lay next to it by forming a level arrangement. The carriers 48 are about heraldic-shaped, they have carrier-pins and a slip corresponding to the two-edge from the reductions 44. In that way they are connected to the shaft 26 without a slip. Each carrier-pin, as can be seen especially from FIG. 3, is directly close to a rolling body 36 when the rolling bodies 36 are in the locked position. A turning movement of the shaft 26 leads initially only to a turning of the carrier 48. With each turning movement one of the two carrier-pins hits the respective neighbouring rolling body 36, while the other moves away from the respective rolling body.

Based on the described arrangement of the jamming planes 42 when starting a turning movement of the same direction with the eccentric part 34, that rolling body 36 would lock itself, which is released by the neighbouring carrier-pin. This releasing movement occurs before the turning movement of the shaft 26 can be transferred upon the eccentric part 34. This slot is achieved by the already described construction of the stop faces. These stop faces have the effect that the eccentric part 34 is carried along only after a turning movement of the shaft 26 by some degrees, i.e. three to eight degrees. Due to the slipable symmetry the described movements occur in both turning directions. Joints are also possible between the shaft 26 and the eccentric part 34, as long as the eccentric part 34 is turned along after a certain turning angle of the shaft 26. Based on the condition that the carriers 48 are turnably connected with the shaft 26 without a slot, so that the carriers 48 with their carrier-pins can release initially the rolling body 36, locked in the turning movement, with a turning movement of the shaft 26, before the turning movement of the eccentric part 34 occurs.

As can be seen especially from FIG. 3 the eccentric part 34 is initially circular. It is constructed in such a way, that it is positioned on both sides along the line 46 along the bore of the external gear 30. Below (FIG. 3) a moon-like gap between the eccentric part 34 and the mentioned bore stays free, to allow i.e. a certain movement of the eccentric part 34 in the direction of the line 46. Above, meaning in the area of the maximum eccentricity, not the eccentric part 34 is positioned but the rolling bodies 36 along the bore of the external gear 30 and with the pressure spring 38 putting pressure on them and due to the geometry of the jamming planes they allow a play compensation, so that a play-free engagement between internal gear 28 and external gear 30 is forced.

We claim:

1. A wobble-hinged metal fitting for an adjustable motor vehicle seat, said fitting comprising at least two hinged brackets connected together by at least one carrier, an eccentric and a shaft running therethrough, each hinged bracket containing a gear, each gear containing an internal gear and an external gear positioned within and in engagement with said internal gear, said external gear having a diameter of the crown circle which is at least one depth of a tooth smaller than the diameter of the root circle of said matching internal gear, said eccentric being positioned next to one of said gears and turnably connected to said shaft for pressuring said gears to grip each other, said eccentric having an eccentricity adjusted to the difference between the diameter of the root circle and the diameter of the crown circle, said eccentric including means-for compensating play in said seat, said compensating means including an eccentric part having a receiving inlet, at least one rolling body, at least two jamming planes positioned next to said rolling body, and at least one spring positioned near said rolling body, each jamming plane running in the opposite direction of the other jamming plane, said rolling body and said jamming planes being positioned together at said receiving inlet, said spring elastically pressuring said rolling body such that one side of said rolling body comes in contact with said matching jamming plane and the other side of said rolling body comes in contact with said matching gear, said carrier being positioned next to said eccentric and turnably connected to said shaft such that when said rolling body is in a locked position, an initial turning movement of said shaft results in releasing said locked rolling body before said eccentric starts to turn.

2. The wobble-hinged metal fitting according to claim 1, wherein said shaft further includes at least one reduction, said eccentric part having a hole which is penetrated by said shaft, said eccentric part having at least two stop faces positioned near said reduction, and said stop faces being aligned towards each other at an obtuse angle.

3. The wobble-hinged metal fitting according to claim 1, including at least two carriers and wherein said eccentric part is positioned between two of said carriers.

4. The wobble-hinged metal fitting according to claim 2, including at least two rolling bodies.

5. The wobble-hinged metal fitting according to claim 4, wherein said spring is positioned between said rolling bodies such that the pressure executed by said spring pushes apart one rolling body from said other rolling body.

6. The wobble-hinged metal fitting according to claim 1, wherein said rolling body is formed into the shape of a coil.

7. The wobble-hinged metal fitting according to claim 1, wherein said hinged brackets are attached together to form a case.

8. The wobble-hinged metal fitting according to claim 1, wherein one of said internal gears contains a different number of teeth than the other said internal gear.

9. The wobble-hinged metal fitting according to claim 1, wherein both of said internal gears contain the same number of teeth and one of said external gears contains a different number of teeth than other said the external gear.

10. The wobble-hinged metal fitting according to claim 1, wherein both of said internal gears contain an uneven number of teeth.

11. The wobble-hinged metal fitting according to claim 1, wherein both of said external gears contain an uneven number of teeth.

12. The wobble-hinged metal fitting according to claim 1, wherein both of said internal gears contain an even number of teeth.

13. The wobble-hinged metal fitting according to claim 1, wherein both of said external gears contain an even number of teeth.

14. The wobble-hinged metal fitting according to claim 4, including at least two reductions which are positioned at rest at a level which runs parallel to another level defined by an axis of said shaft and by the center of a connecting axis of said rolling bodies.

15. The wobble-hinged metal fitting according to claim 1, wherein said receiving inlet is positioned on both sides of a maximum of said eccentric.

16. The wobble-hinged metal fitting according to claim 1, wherein said external gears are formed into a one piece gear rim having two opposing facing partial areas such that one of said partial areas engages with one of said internal gears and said other opposing partial area engages said other internal gear.

* * * * *